United States Patent [19]

Locke et al.

[11] Patent Number: 5,678,600

[45] Date of Patent: Oct. 21, 1997

[54] FILLING VALVE

[76] Inventors: Randal D. Locke; Daniel P. Dunbar; Teresa M. Locke, all of P.O. Box 1325, Redway, Calif. 95560-1325

[21] Appl. No.: 479,712

[22] Filed: Jun. 7, 1995

[51] Int. Cl.⁶ .................. F16K 24/00; F16K 31/385
[52] U.S. Cl. .................. 137/414; 137/453; 137/587
[58] Field of Search .................. 137/393, 403, 137/414, 436, 453, 587; 251/127

[56] References Cited

U.S. PATENT DOCUMENTS

| | | | |
|---|---|---|---|
| 3,455,055 | 7/1969 | Chute | 47/71 |
| 3,596,809 | 8/1971 | Taubenheim | 137/212 |
| 3,610,478 | 10/1971 | Johnston | 137/212 |
| 3,733,746 | 5/1973 | Allen, Jr. | 47/38 |
| 3,758,987 | 9/1973 | Crane, Jr. | 47/38.1 |
| 3,775,904 | 12/1973 | Peters | 47/38.1 |
| 3,783,555 | 1/1974 | Peters | 47/38 |
| 3,871,131 | 3/1975 | Berglund | 47/38.1 |
| 3,903,644 | 9/1975 | Swift et al. | 47/38 |
| 4,052,818 | 10/1977 | Hagerty | 47/81 |
| 4,065,095 | 12/1977 | Johnson | 251/118 |
| 4,083,147 | 4/1978 | Garrick | 47/80 |
| 4,094,327 | 6/1978 | Brandelli | 137/414 |
| 4,100,699 | 7/1978 | Skaife | 47/81 S |
| 4,148,155 | 4/1979 | Allen | 47/59 |
| 4,159,102 | 6/1979 | Fallon et al. | 137/212 |
| 4,180,096 | 12/1979 | Johnson | 137/403 |
| 4,183,175 | 1/1980 | Magee | 47/79 |
| 4,198,784 | 4/1980 | Sukert | 47/79 |
| 4,240,606 | 12/1980 | Johnson | 251/127 |
| 4,292,996 | 10/1981 | Pataki et al. | 137/393 |
| 4,299,054 | 11/1981 | Ware | 47/81 S |
| 4,324,070 | 4/1982 | Swisher | 47/81 |
| 4,329,815 | 5/1982 | Secrest | 47/80 |
| 4,344,251 | 8/1982 | Edling | 47/80 |
| 4,356,665 | 11/1982 | de Oliveira | 47/80 |
| 4,369,598 | 1/1983 | Beckwith | 47/81 S |
| 4,510,712 | 4/1985 | Whitcomb | 47/66 |
| 4,527,354 | 7/1985 | Selier | 47/81 |
| 4,546,571 | 10/1985 | Scrivens | 47/81 |
| 4,557,071 | 12/1985 | Fah | 47/81 |
| 4,790,349 | 12/1988 | Harris et al. | 137/393 |
| 4,829,709 | 5/1989 | Centafanti | 47/81 S |
| 4,887,635 | 12/1989 | Johnson | 137/393 |
| 4,937,972 | 7/1990 | Freitus | 47/62 |
| 4,945,944 | 8/1990 | Chen | 137/414 |
| 5,020,261 | 6/1991 | Lishman | 47/79 |
| 5,069,243 | 12/1991 | Foreman | 137/393 |
| 5,341,596 | 8/1994 | Kao | 47/79 |
| 5,412,907 | 5/1995 | Anderson | 47/85 |

FOREIGN PATENT DOCUMENTS

| | | | |
|---|---|---|---|
| 109632 | 8/1966 | Norway | 47/79 C |
| 673076 | 2/1990 | Switzerland | 47/79 C |
| 2095083 | 9/1982 | United Kingdom | 47/79 C |

*Primary Examiner*—George L. Walton
*Attorney, Agent, or Firm*—Millen, White, Zelano, & Branigan, P.C.

[57] ABSTRACT

A multi-purpose automatic filing basin is provided for containing a selected amount of water which is used for various purposes. The water may be transferred from the basin by wicks or by a pump to water using devices such as plant pots or toys or may be provided for direct use from the basin for devices such as animal feeders and habitats. The basis is kept supplied with water from a pressurized source by a specialized valve which opens in response to a drop in water level below a first selected level and closes in response to the water level reaching as second selected level.

9 Claims, 6 Drawing Sheets

FILLING VALVE

RELATED APPLICATIONS

This application is related to U.S. patent application Ser. No. 08/488,289 titled Multi-Purpose Automatic Filling and Leveling Fluid Basin and U.S. patent application Ser. No. 08/488,292 titled Milti-Purpose Automatic Filling and Leveling Fluid Basin With Water Transfer, filed in the names of the same inventors as this application on even date.

FIELD OF THE INVENTION

The present invention relates to a filling valve and more particularly to a filling valve which cooperates with a source of pressurized liquid such as water to fill a basin.

BACKGROUND ART

In its preferred embodiment, the present invention incorporates a number of improvements to a fluid diaphragm valve used for toilets, described in U.S. Pat. No. 4,240,606 and incorporated herein by reference.

A reliably repeatable self-leveling fluid valve that is also compact, inexpensive to manufacture and impervious to typical environmental forces, is needed in the so-called 'self watering' or 'automatic' growing containers for plants. The following eighteen patents allegedly describe some form of 'self watering' or 'automatic' growing container for plants:

| | | | |
|---|---|---|---|
| 3,733,746 | Allen Jr. | May 22, 1973 | Self Feeding Flower Pot |
| 3,758,987 | Crane Jr. | Sep. 18, 1973 | Automatic Plant Watering Device |
| 3,775,904 | Peters | Dec. 4, 1973 | Self-Watering Flower Pot |
| 3,783,555 | Peters | Jan. 8, 1974 | Self-Watering Flower Pot |
| 3,871,131 | Berglund | Mar. 18, 1975 | Self-Watering Plant Pots or Receptacles |
| 3,903,644 | Swift | Sep. 9, 1975 | Self-Watering Planter and Method of Making |
| 4,052,818 | Hagerty | Oct. 11, 1977 | Method and Apparatus for Containerizing Plants with a Self-Watering System |
| 4,148,155 | Allen | Apr. 10, 1979 | System and Apparatus for Automatically Feeding |
| 4,183,175 | Magee | Jan. 15, 1980 | Self-Watering Apparatus for Growing Plants |
| 4,198,784 | Sukes | Apr. 22, 1980 | Vessel for Supporting and Automatically Providing Liquid to Vegetation |
| 4,324,070 | Swister | Apr. 13, 1982 | Self-Watering Planter |
| 4,329,815 | Secrest | May 18, 1982 | Self Controlled Watering Planter Device |
| 4,344,251 | Edlung | Aug. 17, 1982 | Self-Irrigating Pot for Plants |
| 4,356,665 | de Oliveos | Nov. 2, 1982 | Self-Watering Planter |
| 4,527,354 | Sellen | Jul. 9, 1985 | Implantable Reservoir for Automatic Watering |
| 4,937,972 | Freitus | Jul. 3, 1990 | Self-Contained Plant Growth System |
| 5,020,261 | Lishman | Jun. 4, 1991 | Moisture Sensitive Self-Watering Planter |
| 5,341,596 | Kao | Aug. 30, 1994 | Automatic Water Supply Device for Potted Plants |

In fact, these containers are neither self-watering nor automatic because they require human refilling of the reservoir.

Three issued patents that are also true automatic plant pots are:

| | | | |
|---|---|---|---|
| 4,083,147 | Garack | Apr. 11, 1978 | Automated Planter Box System |
| 4,546,571 | Scrivens | Oct. 15, 1985 | Plant Watering Apparatus |
| 4,557,071 | Fah | Dec. 10, 1985 | Automatic Watering and Feeding System for Plants |

There is a need for a fill valve which is adapted for use in combination with a water reservoir which converts the reservoir into a self-filling and self-leveling fluid basin which can perform a number of functions and cooperates with various other structures, including, but not limited to a plant pot converter, an animal water feeder, an underground spring, a bird bath, a humming bird feeder, an amphibian habitat, an animal/bird cage, a plant pot and a water toy, all as disclosed in the above-identified concurrently filed applications, whose disclosures are incorporated herein by reference.

SUMMARY OF THE INVENTION

This invention relates to a fill valve for filling a basin having a bottom with an inlet opening, an inner surface and an outer surface. The fill valve is a modification of an adjustable diaphragm fill valve (Johnson, U.S. Pat. No. 4,240,606) which is extensively used commercially in toilet water reservoirs and which comprises, like the valve of this invention, water level adjustment means in mechanical connection with means positioned in the upper portion of the interior cavity of the valve which reciprocally urges the valve into its closed position, in response to the weight of liquid in the basin above the diaphragm when the valve is mounted therein and the liquid in the water reservoir is at a preselected liquid level, and into its open position, in response to a drop in the level of the liquid in the water reservoir below the preselected liquid level; a liquid inlet port in liquid communication with the inlet port of the water reservoir; a liquid outlet port providing liquid communication between the lower portion of the valve cavity and the interior of the water reservoir for dispensing liquid from the fill valve into the water reservoir when the valve is in its open position; and a gas inlet port in gas communication with ambient air for maintaining the diaphragm of the fill valve at ambient air pressure.

The fill valve of this invention differs from the commercially available Johnson valve inter alia by:

(a) the valve being adapted to fit completely within the interior of a water basin having, as the means for mounting thereon, a valve mounting seat positioned on the interior surface of the bottom of the basin;

(b) the liquid and gas inlet ports of the valve being both positioned above the seal formed between the valve and the basin when the former is mounted on the latter;

(c) the bottom of the valve comprising a flat surfaced mounting means for interiorly mounting the valve onto the mounting seat of the basin and, cooperatively, with the valve seating means of the basin, forming the liquid-tight and gas-tight seal between the valve and the basin when the former is mounted on the latter;

(d) the liquid inlet port being positioned in the center of the bottom of the valve and is adapted to provide liquid communication to the valve with the liquid under pressure after it has passed through the inlet port of the basin and the basin is connected to the source thereof;

(e) the gas inlet port of the valve being position in the bottom of the valve, axially ofset between the hole in the center of the bottom of the valve and the circumference thereof. Like the commercial version of the Johnson valve, the fill valve of this invention preferably includes a flow impedance path including a compact array of baffles defining multiple consecutive turns for dissipating fluid pressure without substantial velocity increases in consequent cavitation and noise.

DESCRIPTION OF THE PREFERRED EMBODIMENT OF THE INVENTION

The Filling Valve of this invention is adapted for use as the valve in a Multi-purpose Automatic Filling and Leveling Fluid Basin as claimed in the concurrently filed copending applications identified above, which is a fluid holding vessel called the basin 10 which can be of any size or shape and will in most cases be produced by injection molding using plastics. The basin accepts within it a readily detachable adjustable fill valve 14 that is connected to a pressurized water or other fluid supply 58. The valve fills and maintains the level of fluid in the vessel which can be selected and adjusted by the user.

The basin 10 is composed of two primary components ultrasonically welded together to form a water and air tight one piece unit. These components are called the basin body 16 and the air/fluid utility bracket or utility bracket 12. In addition to these fused parts are; the twist-in compression cam 108 equipped automatic filling and leveling diaphragm valve 14; a silicone air isolating gasket 96 and a matching fluid isolating gasket 98 that seal the areas between the valve 14 and the basin body 16, a small plastic snorkle cap 24, the insert x thread fittings 46 that fit the external fluid line port 18 and external drain line port 38, and the optional punch-in basin drain screen 120.

The utility bracket 12, when fused to the basin body 16, performs three functions:

Fluid (preferably filtered) is delivered from any pressurized source through a standard ⅛ inch (inside diameter) fluid delivery line 56 (commonly referred to as drip irrigation line) connected to an optional existing quick disconnect fittings 50 and 54 and then connected directly or with additional fluid delivery line to the insert x thread barbed fitting 46 that threads into the utility bracket 12 in its external fluid line port 18. Attachment of the fluid delivery line 56 is facilitated by the space for thumb and fingers created by the utility access cutouts 69 just above the said barbed fitting. The optional spring clamp 48 can be used to secure the fluid delivery line 56 to the insert x thread fitting 46. The fluid flows through the fluid supply channel 20 and through the internal fluid port 22 on the bottom of the basin 10 and into the valve 14.

Ambient air for operation of the diaphragm valve 14 flows under the snorkle cap 24 down through the basin snorkle body 26 which is supported by the basin snorkle support rib 28, past the utility snorkle debris trap 30, around the utility snorkle 32, down into the utility air channel 34, then through the air channel then up through the bottom of the basin 10, through the internal air port 36, into the air trough 92, into the valve base air port 106 and into the underside of the diaphragm in the valve 14. The snorkle cap 24 keeps debris from the attachments or other sources from entering the basin snorkle body 26 and also acts as a 'diving bell' flood protection device. Should the basin 10 be in an environment where external water elevates past the bottom edge of the basin vent/latch ports 70 and over the snorkle cap 24 the snorkle cap prevents entry of water into the interior of the snorkle assembly as a result of its lower edge being below the upper edge of the basin snorkle body 26. The basin 10, with or without attachments can endure a true flood (if attached to a surface using the basin hold-down tabs 68 or otherwise held in place) and when no longer flooded will return to normal operation without failure including during the flood itself when the valve 14 shuts itself off. The snorkle cap 26 is ribbed on its interior surfaces to create secure multiple open vent grooves when pushed onto the basin snorkle body 26. Locating the snorkle assembly inside the basin 10 prevents accidental damage and prevents fouling by mud, soil, water, insects, and other debris that could occur if ported anywhere external to the basin 10.

Fluid is drained from the basin 10 by removing the tear out drain line tab 44, in the interior bottom edge of the basin and inserting the optional basin drain screen 120 into the internal basin drain line port 42 opened by said removed tear out tab and exposing the internal utility drain line port 40 that accepts the drain screen. By connecting a ⅛ inch drain discharge line 60 to a insert x thread fitting 46 threaded into the external drain line port 38 the user may drain the basin and can attach a standard drain regulating valve 62 to control drain flow rates based on the attachment used and the requirements or desires of the user.

The utility bracket 12 is a uniform thickness throughout its entirety with two exceptions; the utility snorkle 32 walls can be thinner as they are protected by the basin snorkle body 26 and the areas immediately above the external fluid line port 18 and the external drain line port 38 which are small, thick pockets of material created as a result of injection mold release requirements. When ultrasonically fused the basin body 16 and the utility bracket 12 fit together and create completely isolated seals around each of the three functional areas listed above.

After ultrasonic welding, the utility bracket 12 also finishes the basin feet 64 and completes the 'footprint' of the basin 10 as well as strengthening the basin bottom in the area where the basin ribs 66 are absent. For ease of storage and shipping the basin 10 stacks and nests at approximately ⅔ths of its own height by sitting on the basin stacking supports 76 all four of which surround the interior of the basin at approximately 90 degree increments. The top of the basin snorkle body 26 nests inside the hollow interior of the utility snorkle 32 above it. The scalloped bottom edge of the basin 10 is aligned so as to nest over and next to the basin stacking supports 76 with their mutual corner radii and thereby 'lock' the basin into place which prevents shifting and protects the basin snorkle body 26 and related assembly during storage, shipping and handling.

After installing the fluid isolating gasket 96 in the fluid gasket trough 88, and the air isolating gasket 98 in the air gasket trough 90, the valve 14 twists into the valve mounting flange 80 by slipping down past the retention tabs 82, (2 each opposing) and twisting 90 degrees until the retention tab compression cams 84 (2 each opposing) and the valve base 100 and the valve base compression cams 108 (2 each opposing) engage forcing the valve downward until the retention tab stops 86 (2 each opposing) stop the valve. The twisting downward motion during valve 14 insertion, compresses the larger diameter air isolating gasket 98 and the smaller diameter liquid isolating gasket 96 downward and outward into the four gasket retention rings 94 that border both sides of both said gaskets and between which is created the air trough 92 which is an isolated encircling trough allowing ambient air portage even in the event of incomplete insertion or incorrect positioning of the valve. Valve base seating beads 101 are molded in relief on the underside of the valve base 100 surrounding the valve base fluid port 104 and enclosing within the outer circumferal bead the valve base air port 106. The said seating beads further compress the center of the surrounding said gaskets enhancing the sealing function and preventing the escape of pressurized water or leakage in the ambient air system. Due to the central axis location of the internal fluid port 22 and the opposing valve base fluid port 104 the delivery of fluid is un-affected by valve 14 position. The valve 14 will operate when installed in either of the two possible insertion positions, however four of the attachments for the basin 10 require the valve be in its preferred position which is facing the utility or 'back' wall of the basin and fully stopped by the retention tab stops 86. This allows the said four attachments to utilize all of the available space in the basin 10 by having the attachment 'hug' the basins interior walls and floor and wrap around the valve 14 and the basin snorkle body 26 assembly To function automatically, the basin 10 (with valve 14 installed) must be connected to a pressurized fluid line between 5 psi and 80 psi and with fluid near or at the consistency of water and of a non-corrosive character. The user may adjust the level of the fluid in the basin 10 by use of the valve adjusting screw 15 located on the top of the valve 14. Minimum fluid level is at the top edge of the adjusting screw 15. The maximum fluid level is established by the user and the attachments connected to the base 10, but is always below the basin vent/latch ports 70 of the basin 10. The user may monitor the fluid level in the basin 10 by using the fluid level sight glass 78 on the 'front' wall of the basin. The basin 10 and all of its attachments operate at the minimum fluid level, thus allowing the user (or environmental forces) to tilt the basin ten degrees or less without spilling fluid. The valve 14 and its fluid level control performance is unaffected by said tilt or tilting.

To function manually, the basin 14 requires the manual operation insertion plug 110 be twisted by hand (after intallation of the fluid and air isolating gaskets 96 and 98) using the manual operation insertion plug finger key 112 molded on the top of said plug. The manual operation insertion plug 110 is identical in shape to the valve base 100 and like the valve base has opposing manual operation insertion plug cams 114. When installed into the valve mounting flange 80 the said insertion plug seals the internal fluid port 22 and the internal air port 36 and turns the basin 10 into a reservoir that must be filled by the user using the detachable optional basin funnel 147 that slips through any of the available basin vent/latch ports 70.

To function in series, a 'controlling' basin 10 with valve 14 installed is connected to a series of additional 'passive' basins that have multiple basin insertion plugs 116 installed in their valve mounting flanges 80 and are all on the same level serface as the controlling basin. The controlling basin 10 in connected to a constant fluid supply 58 and must have the basin drain screen 120 installed and the drain discharge line 60 connected to the insert x thread fitting 46 threaded into the external drain line port 38 and connected to the external fluid line port 18 of the first 'passive' basin of the series. Fluid, controlled by the controlling basin 10, ports water through the center of the multiple basin insertion plug fluid port 118 in the 'passive' basin. That passive basin in turn may have the drain discharge line 60 activated and connected in turn to additional 'passive' basins in series.

Figure 1:
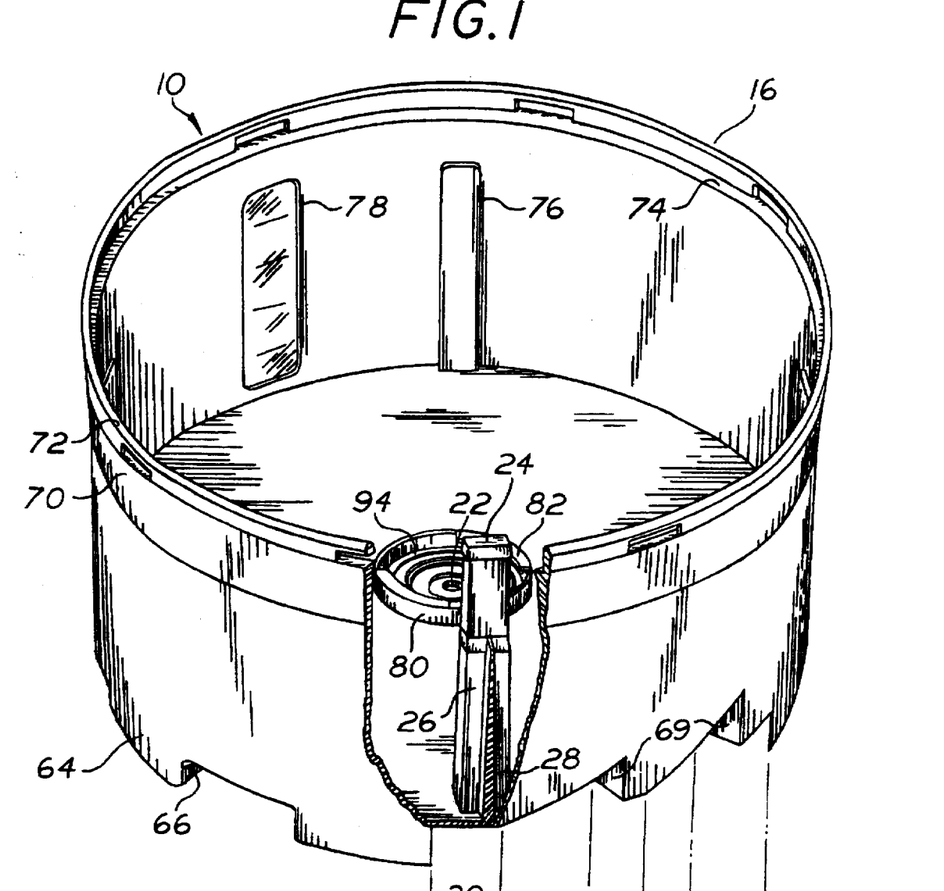
FIG. 1 is an oblique top view of the basin body prior to fusing of the utility bracket.
Figure 2:
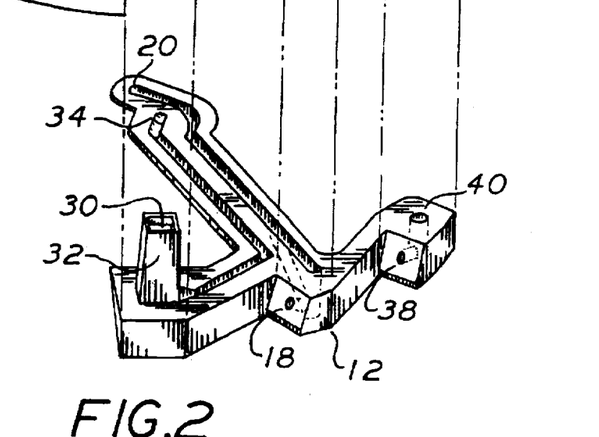
FIG. 2 is an oblique top view of the utility bracket before fusing to the basin body shown in FIG. 1.
Figure 3:
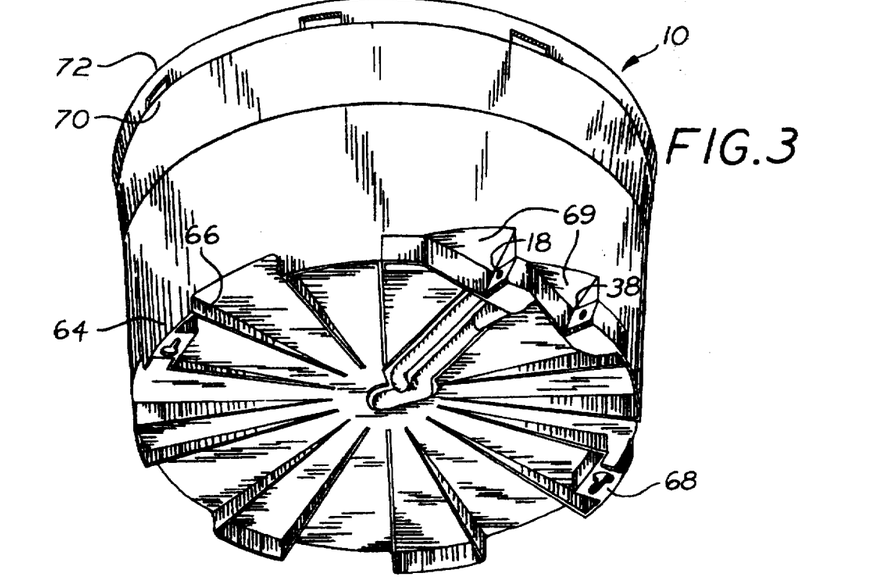
FIG. 3 is an oblique bottom view of the basin body and utility bracket fused together.
Figure 4:
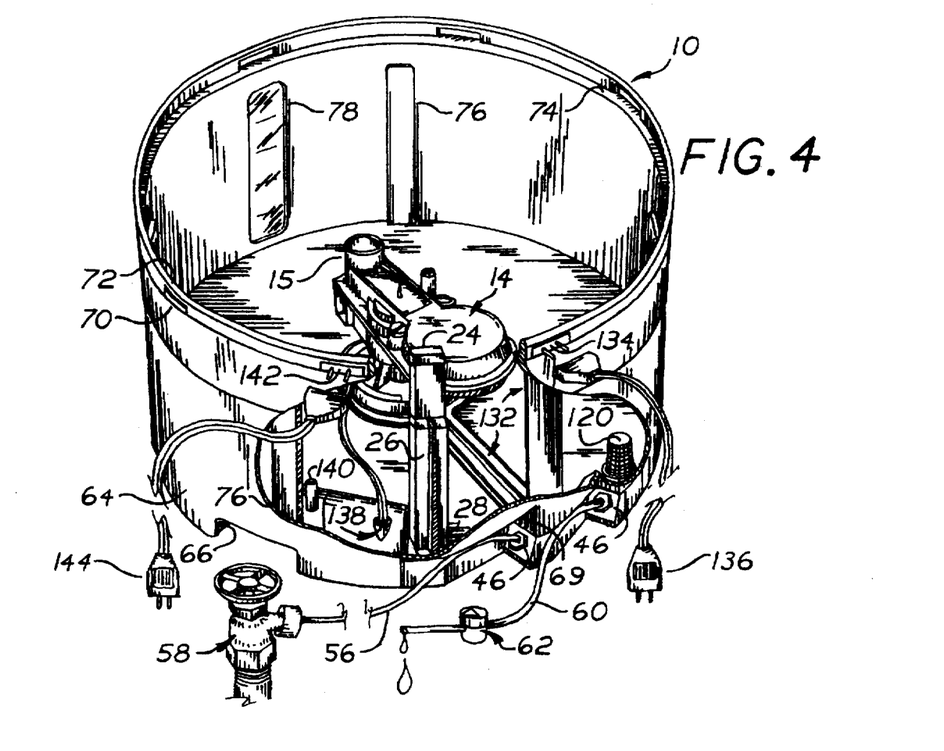
FIG. 4 is an oblique top view of the basin in its preferred embodiment with fittings.
Figure 5:
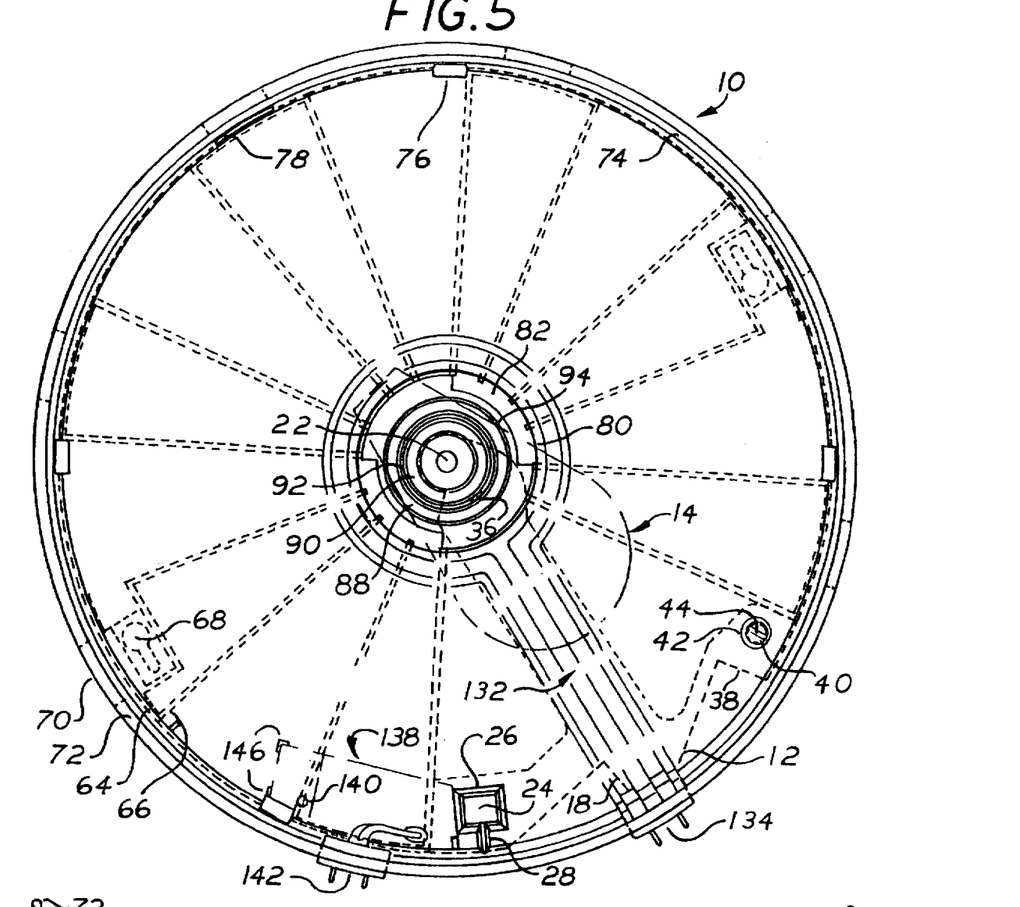
FIG. 5 is a plan view of the basin interior and structure with accessories as shown in FIG. 4.
Figure 6:
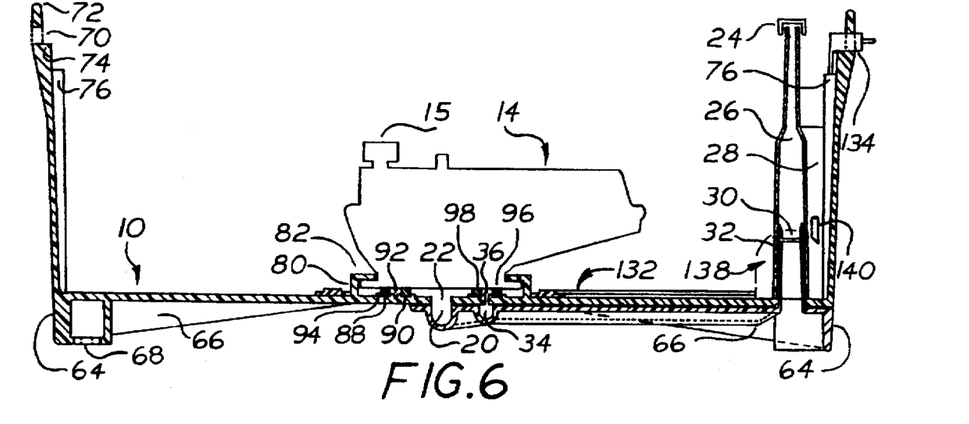
FIG. 6 is a combined sectional view of the basin components and valve as shown in FIG. 5. This is a false view with critical components shown along the same plane to demonstrate clearances for attachments.
Figure 7:
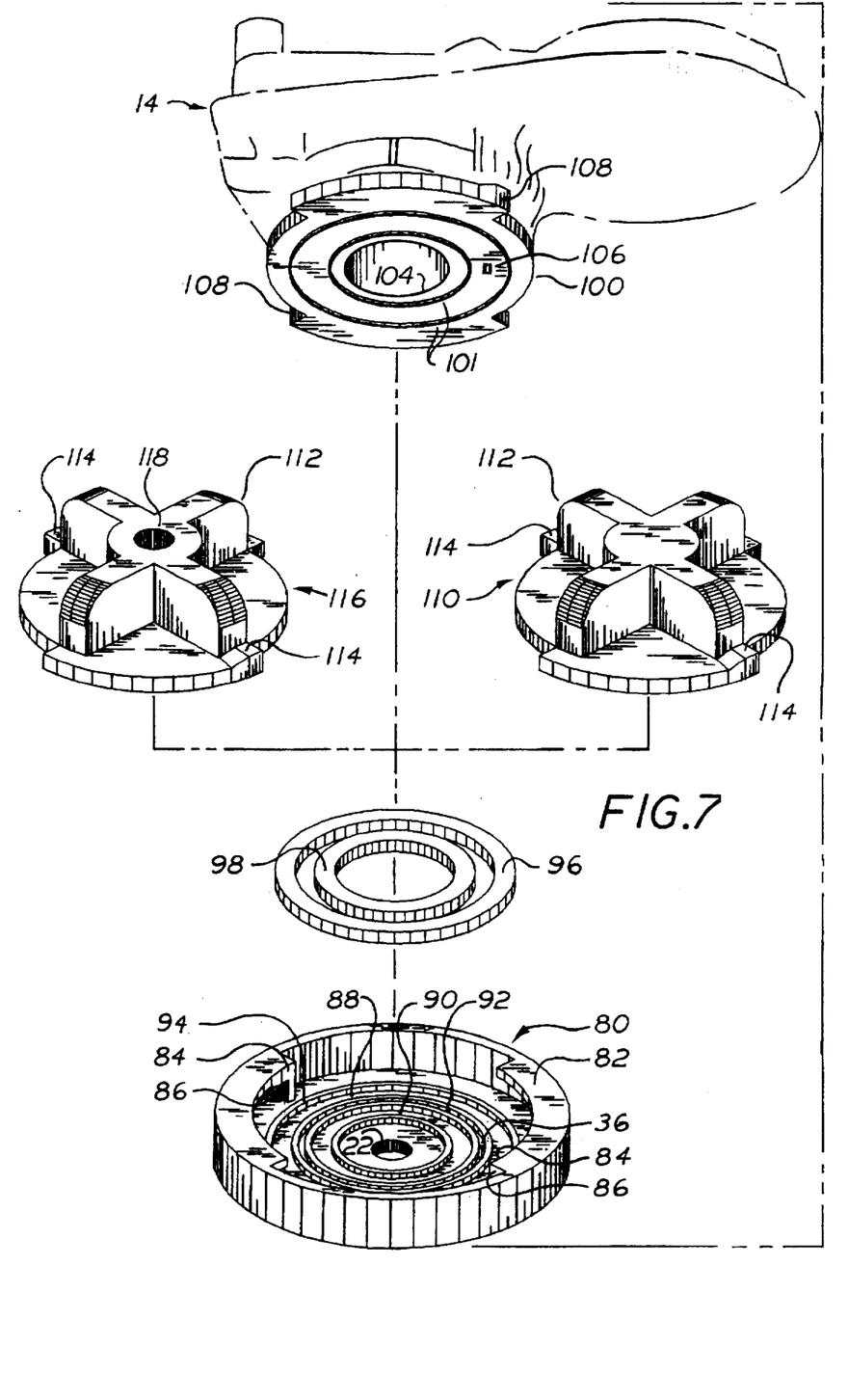
FIG. 7 is an exploded oblique view of the valve base, air and fluid gaskets, valve mounting flange, and basin insertion plugs as shown in FIGS. 5 & 6.
Figure 8:
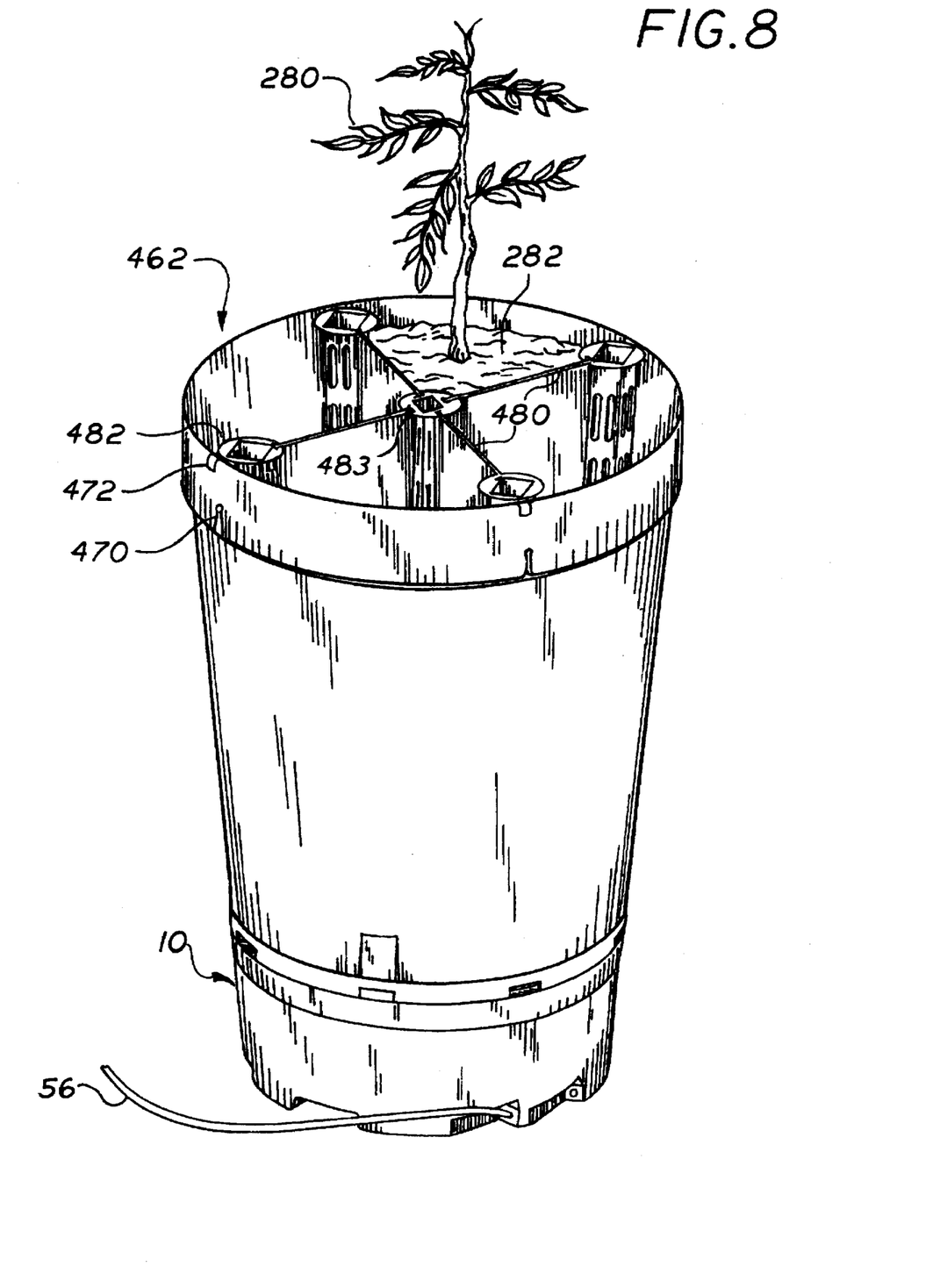
FIG. 8 is an oblique top view of the gardener attached to the basin shown in FIG. 4.
Figure 9:
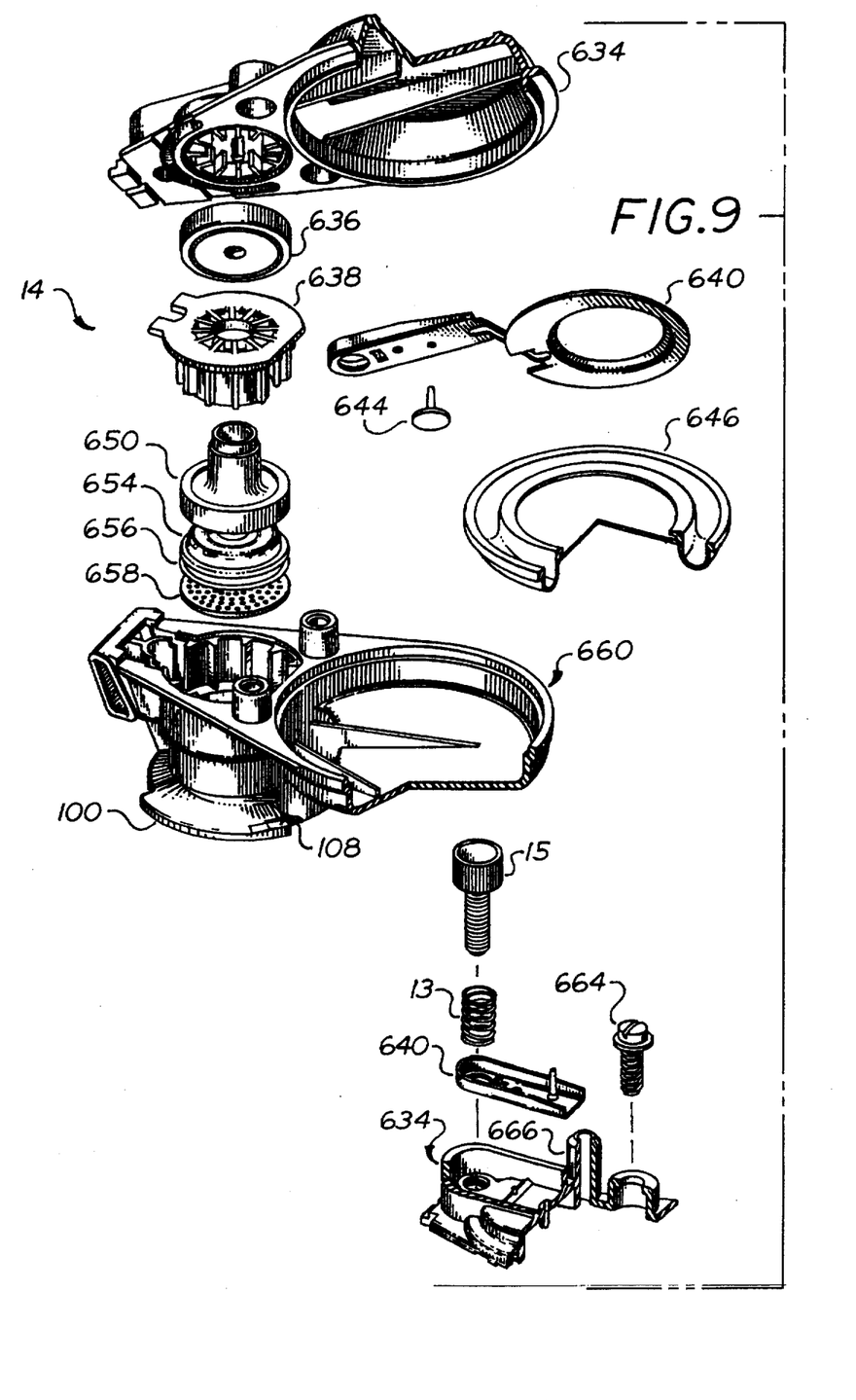
FIG. 9 is an oblique exploded view of the valve 14 and its adjusting screw that fits in the basin 10.

The valve of the present invention shown in FIG. 9 is a modification of a valve originally conceived of and designed for use in toilets by Dwight N. Johnson of California. (Latest U.S. Pat. No. 4,240,606, Dec. 23, 1980) incorporated herein by reference. This valve is currently being manufactured under the name FILLpro Toilet Tank Fill Valve and according to the manufacturer (Delta/Peerless Faucet Corp.) over nine million of the valves have been distributed worldwide since its inception. The mode of attachment of the valve of FIG. 9 must be completely redesigned and the adjusting screw and spring must be shortened to fit and operate with the present invention. No modifications to the valve body itself as disclosed in U.S. Pat. No. 4,240,606 nor to its mechanism have been made, so the functionality of the valve is unaffected.

Specially modified versions of the FILLpro valves have been operating continuously in test units that mimic the present invention in all of its embodiments. The test have shown that both the anti-siphon and the standard models of the FILLpro valve are capable of reliable, long term, regulated flow rates as low as one drop per minute. Its inherent nature as a toilet valve, (requiring appropriate flow rates) means the valve is also able to respond quickly when needed with outstanding flow performance, plus the valve is extremely quiet. The valve functions effectively at any angle up to 30 degrees on any axis and is able to maintain a water level less than 12 millimeters above its own body (or fill a vessel many feet over its own body) and to do so repeatedly (for years) with excellent accuracy.

The test valves have been disassembled and re-assembled repeatedly with no change in performance and all of their pars are replaceable. They have been beaten, kicked, left in open vessels through months of storms and collected debris; covered with algae; buried in mulch, dirt and sand; been frozen dry out of the package and then been frozen with water inside the valve in empty vessels. It was only when the valve was frozen full of water in a vessel full of water that it ended up as a wounded valve, and that wound was only the adjusting screw female thread in the valve body being ripped out by the pressure, the rest of the valve was fine.

The patent of Dwight N. Johnson (numbered U.S. Pat. No. 4,240,606 and describing the Fill Valve) is incorporated into this disclosure with the following modifications.

Fluid is delivered to the valve by the means and method disclosed in this application in the Description of the Preferred Embodiment of the Invention; paragraph three.

Ambient air as required by the valve is provided by the means and method disclosed in this application in the description of the Preferred Embodiment of the Invention; paragraph four.

Connection and operation of the valve and the means and method thereof are disclosed in the Description of the Preferred Embodiment of the Invention; paragraphs eight and nine.

The physical changes to the valve from U.S. Pat. No. 4,240,606 are illustrated in FIGS. 4, 6, 7 and 9 of this specification and consist of two particular changes. First, the adjusting screw as disclosed by the Johnson patent and labeled in that patent as Reference Number 148, must have the un-threaded portion of its shank (Ref. #156 of Johnson) entirely removed, which shortens said screw to half its original height and allows the present invention to stack and nest with the valve installed and also increases the available area for the attachments to the present invention. The spring (Ref. #144 of Johnson) for the screw (Ref. #148 of Johnson) must be replaced with a smaller lighter spring appropriate to the requirements of the shallow fluid levels used by the present invention. Second, the valve attachment assembly and its related hard ware (best shown in the Johnson patent in FIG. 3) must be removed completely up to the line just above the Section Line 3, which is just below the base of the valve. Removing said portion of the valve leaves a flat base with a large hole in its center and two very small square holes side by side straddling the center line of the valve and projecting up and into the underside of the valve diaphragm assembly. This now flat, circular base 100 would have one if not two compression beads 107 molded into the base as well as the valve base compression cam 108 flanges, both shown in FIG. 7 with a side view shown in FIG. 6.

LIST OF REFERENCE NUMBERS

10 Basin (complete)
12 Utility bracket
13 Adjusting screw spring
14 Valve
15 Valve adjusting screw
16 Basin body (without utility bracket)
18 External fluid line port
20 Fluid supply channel
22 Internal fluid port
24 Snorkle cap
26 Basin snorkle body
28 Basin snorkle support rib
30 Utility snorkle debris trap
32 Utility snorkle
34 Utility air channel
36 Internal air port
38 External drain line port
40 Internal utility drain line port
42 Internal basin drain line port
44 Tear out drain line tab
46 Insert x thread fittings
48 Spring clamp
50 Quick disconnect fitting
54 Quick disconnect with auto shut off
56 Fluid delivery line
58 Fluid supply
60 Drain discharge line
62 Drain regulating valve
64 Basin feet
66 Basin feet/bottom reinforcing ribs
68 Basin hold-down tabs
69 Utility access cutouts
70 Basin vent/latch ports
72 Basin rim
74 Attachment seating rim
76 Basin stacking support
78 Fluid level sight glass
80 Valve mounting flange
82 Retention tabs
84 Retention tab compression cam
86 Retention tab stop
88 Fluid gasket trough
90 Air gasket trough
92 Air trough
94 Gasket retention rings
96 Fluid isolating gasket
98 Air isolating gasket
100 Valve base
101 Valve base seating beads
104 Valve base fluid port
106 Valve base air port
108 Valve base compression cam
110 Manual operation insertion plug
112 Manual operation insertion plug finger key
114 Manual operation insertion plug cam
116 Multiple basin insertion plug
118 Multiple basin insertion plug fluid port
120 Basin drain screen
122 Square basin
124 Rectangular basin
126 Doughnut basin
128 Semi-circle basin
130 Corner basin
132 Heater
134 Heater male electrical terminals
136 Heater plug and cord
138 Submersible fluid pump
140 Pump water outlet
142 Fluid pump male electrical terminals
144 Pump plug and cord
146 Pump mounting tabs
280 Tree
282 Soil
462 Gardener attachment
464 Gardener seating rim
466 Gardener bottom rim vent slots
468 Gardener top rim
470 Hanger keys
482 Areating root pruners-wall
483 Areating root pruners-column

We claim:

1. In an adjustable diaphragm fill valve adapted for use in an automatic filling and liquid level regulating device which comprises a basin having a liquid inlet port in the bottom thereof for receiving a liquid under pressure from a source thereof, for holding a volume of the liquid therein and for dispensing the liquid therefrom at ambient pressure, which device also has means for mounting the valve on the basin and sealing means for providing a liquid and gas tight seal between the valve and the basin, which valve comprises water level adjustment means in mechanical connection with means positioned in the upper portion of the interior cavity of the valve which reciprocally urges the valve into its closed position, in response to the weight of liquid in the basin above the diaphragm when the valve is mounted therein and the liquid in the basin is at a preselected liquid level, and into its open position, in response to a drop in the level of the liquid in the basin below the selected liquid level; a liquid inlet port in liquid communication with the inlet port of the basin; a liquid out port providing liquid communication between the lower portion of the valve cavity and the interior of the basin for dispensing liquid from the fill valve into the basin when the valve is in its open position; and a gas inlet port in gas communication with ambient air for maintaining the diaphragm of the fill valve at ambient air pressure, the improvement wherein:

(a) the valve is adapted to fit completely within the interior of a basin having, as the means for mounting thereon, a valve mounting seat positioned on the interior surface of the bottom of the basin;

(b) the liquid and gas inlet ports of the valve are both positioned above the seal formed between the valve and the basin when the former is mounted on the latter;

(c) the bottom of the valve comprises a flat surfaced mounting means for interiorly mounting the valve onto the mounting seat of the basin and, cooperatively, with the valve seating means of the basin, forming a liquid-tight and gas-tight seal between the valve and the basin when the former is mounted on the latter;

(d) the liquid inlet port in positioned in the center of the bottom of the valve and is adapted to provide liquid communication to the valve with the liquid under pressure after it has passed through the inlet port of the basin and the basin is connected to the source thereof;

(e) the gas inlet port of the valve is positioned in the bottom of the valve, axially ofset between the hole in the center of the bottom of the valve and the circumference thereof.

2. The valve of claim 1, adapted to be mountable onto the basin and friction sealed thereto digitally.

3. The valve of claim 1, wherein the mounting means comprises protuberances adapted to lock the valve onto the basin.

4. The valve of claim 3, wherein the protuberances are annular retention tabs which are adapted to provide cam action compression within the means for mounting the valve on the mounting seat of the basin when the valve is mounted on the basin.

5. The valve of claim 4, wherein the forward, relative to the mounting direction, end of the retention tabs is thinner and the rearward end thereof is thicker and the retention tabs, in cooperation with the valve mounting seat positioned on the interior surface of the bottom of the basin, produce a compressing cam action which seals the valve to the valve mounting seat when the valve is mounted thereon.

6. The valve of claim 5, wherein the flat surfaced mounting means of the valve is circular and he valve is adapted for mounting and dismounting on the basin digitally in a single rotary motion.

7. The valve of claim 6, wherein the retention tabs are elongaged circumferentially wider portions of the circular valve mounting means.

8. The valve of claim 1, wherein the valve has a low vertical profile so that the upper surface thereof is positioned below the preselected water level of the basin in which it is mounted and thus leave most of interior of the basin vertically unobstructed and therefore free to mount a water using attachment deeply into the interior thereof.

9. The valve of claim 1, adapted to be mountable onto the basin and friction sealed thereto digitally and wherein the mounting means comprises protuberances adapted to lock the valve onto the basin; wherein the protuberances are annular retention tabs which are adapted to provide cam action compression within the means for mounting the valve on the mounting seat of the basin when the valve is mounted on the basin; wherein the forward, relative to the mounting direction, end of the retention tabs is thinner and the rearward end thereof is thicker and the retention tabs, in cooperation with the valve mounting seat positioned on the interior surface of the bottom of the basin, produce a compressing cam action which seals the valve to the valve mounting seat when the valve is mounted thereon; wherein the flat surfaced mounting means of the valve is circular and is adapted for mounting and dismounting on the basin digitally in a single rotary motion; wherein the retention tabs are elongaged circumferentially wider portions of the circular valve mounting means; and wherein the valve has a low vertical profile so that the upper surface thereof is positioned below the preselected water level of the basin in which it is mounted and thus leave most of interior of the basin vertically unobstructed by the valve and therefore free to mount a water using attachment deeply into the interior thereof.

* * * * *